US008941686B2

(12) United States Patent
Nakanishi et al.

(10) Patent No.: US 8,941,686 B2
(45) Date of Patent: Jan. 27, 2015

(54) INFORMATION DISPLAY APPARATUS, DISPLAY CONTROL INTEGRATED CIRCUIT, AND DISPLAY CONTROL METHOD FOR SUPERIMPOSING, FOR DISPLAY, INFORMATION ONTO IMAGES CAPTURED IN A TIME SEQUENCE

(75) Inventors: Koji Nakanishi, Osaka (JP); Kazunori Yamada, Hyogo (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 467 days.

(21) Appl. No.: 13/388,755

(22) PCT Filed: May 17, 2011

(86) PCT No.: PCT/JP2011/002743
§ 371 (c)(1),
(2), (4) Date: Feb. 3, 2012

(87) PCT Pub. No.: WO2011/155130
PCT Pub. Date: Dec. 15, 2011

(65) Prior Publication Data
US 2012/0133815 A1    May 31, 2012

(30) Foreign Application Priority Data

Jun. 8, 2010  (JP) .................................. 2010-131477

(51) Int. Cl.
*G09G 5/00*    (2006.01)
*H04N 5/232*   (2006.01)
*H04B 10/114*  (2013.01)
*H04B 10/116*  (2013.01)

(52) U.S. Cl.
CPC ....... *H04N 5/23293* (2013.01); *H04B 10/1141* (2013.01); *H04B 10/116* (2013.01); *H04N 5/23229* (2013.01)
USPC .......................................... 345/633; 345/634

(58) Field of Classification Search
CPC .. G06T 19/006; G06T 19/00; H04N 5/23293; H04N 5/772; H04N 5/232
USPC ............................................ 345/633; 348/333
See application file for complete search history.

(56) References Cited

U.S. PATENT DOCUMENTS 5,587,800 A * 12/1996 Miyazaki ...................... 358/296
2010/0149399 A1    6/2010 Mukai et al.

FOREIGN PATENT DOCUMENTS

JP         9-74504        3/1997
JP        10-108114       4/1998
(Continued)

OTHER PUBLICATIONS

International Search Report issued Jun. 28, 2011 in corresponding International Application No. PCT/JP2011/002743.

*Primary Examiner* — Devona Faulk
*Assistant Examiner* — Tapas Mazumder
(74) *Attorney, Agent, or Firm* — Wenderoth, Lind & Ponack, L.L.P.

(57) ABSTRACT

An information display apparatus performs a visual light communication and superimposes light source information transmitted from a light source onto images captured in time sequence for display on a screen. The information display apparatus includes an imaging section for capturing an image in an imaging range, a cache memory sequentially caching the light source information transmitted from the light source in the image, a priority level setting section for setting a higher priority to the light source information, cached in the cache memory, in order starting from a light source closest to a current imaging range, and a communications information processing section for deleting the light source information cached in the cache memory in order starting from light source information having the lowest priority level.

9 Claims, 12 Drawing Sheets

(56) References Cited

FOREIGN PATENT DOCUMENTS

| | | |
|---|---|---|
| JP | 2001-245253 | 9/2001 |
| JP | 2004-349797 | 12/2004 |
| JP | 2007-295446 | 11/2007 |
| JP | 2008-66818 | 3/2008 |
| JP | 2009-17540 | 1/2009 |

* cited by examiner

F I G. 7
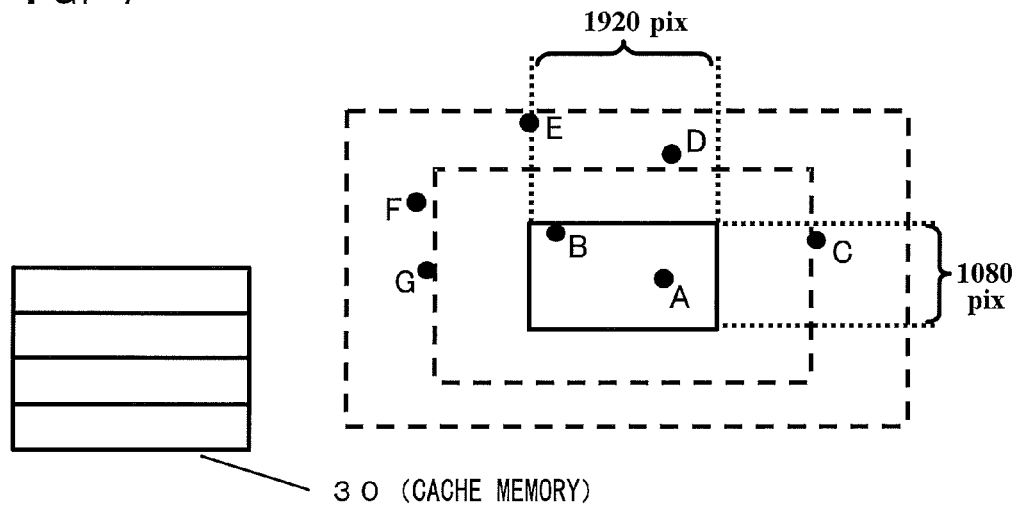
F I G. 8
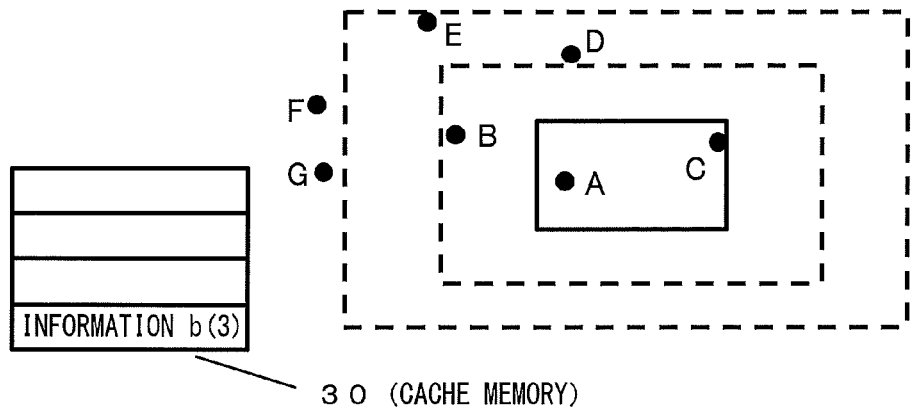
F I G. 9
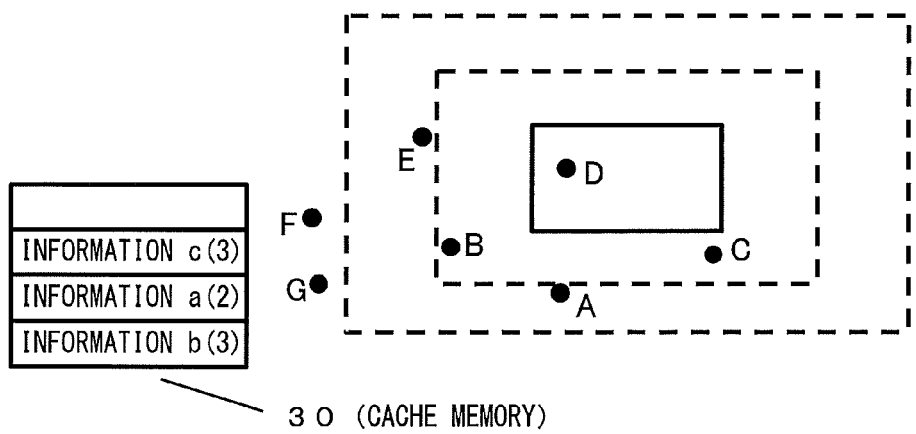

F I G. 1 6
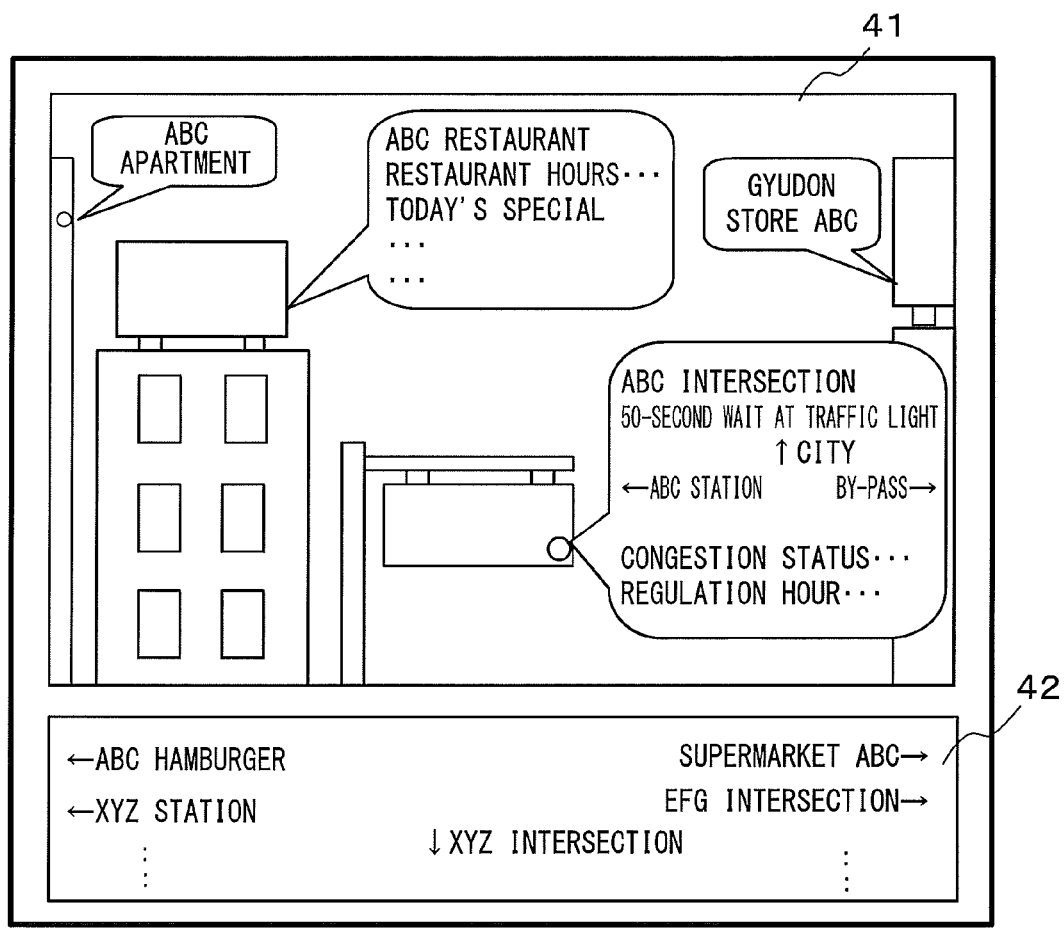

INFORMATION DISPLAY APPARATUS, DISPLAY CONTROL INTEGRATED CIRCUIT, AND DISPLAY CONTROL METHOD FOR SUPERIMPOSING, FOR DISPLAY, INFORMATION ONTO IMAGES CAPTURED IN A TIME SEQUENCE

BACKGROUND OF THE INVENTION

1. Technical Field

The present invention relates to an information display apparatus which superimposes, for display, information for display onto images captured in time sequence, and more particularly, a technique to improve performance of the entire apparatus, efficiently making use of a cache memory.

2. Background Art

Apparatuses have been known which superimpose, onto a captured image, information obtained from an information source (a light source) in an imaging range via a visual light communication with the use of an image sensor to display the resultant image to a user. Patent Literature 1 describes that presentation information as a result of change of brightness, the content of which is relevant to goods or an advertising display, is transmitted from an information source attached to a shelf for the goods at a store, the advertising display in the city, or the like, an imaging device captures images in time sequence, extracts respective presentation information from the change of brightness for each image region, superimposes the extracted presentation information onto the respective captured images, thereby clarifying the correspondence between the goods of the information presentation and the presentation information, and a misunderstanding in information recognition is eliminated.

Such an imaging device, however, can acquire information only from an information source (a light source) that has entered the imaging range. Thus, if the information from the light source is large in size, a user has to wait a predetermined period of time from the image capturing to the superimposition of the information onto the image for display. In a case where a camera operator takes images while moving, the imaging range changes and dropout of the information source occurs frequently. When the imaging range changes and a new information source is captured, communication processing occurs, and, naturally, the imaging device cannot display presentation information regarding the new information source until the processing completes.

On the other hand, if the same information source frequently falls in and out of the imaging range, the communication processing occurs to acquire the same information each time the information source enters the imaging range, which causes waiting time. Consequently, a problem occurs that performance of the entire apparatus is undesirably degraded. To solve such a problem, a method is known in which, for example, presentation information, which is acquired from an information source when the information source enters the imaging range, is saved in a cache memory even after the presentation information falls out the imaging range, and when the same information source enters the imaging range, the presentation information is loaded from the cache memory for reuse.

Also, a wireless optical transmission system which allows high-speed and accurate adjustment of an optical axis is disclosed in Patent Literature 2. Patent Literature 2 describes that a master device attached to the ceiling or the like controls and transmits narrow directional light for signal transmission and wide directional light for the optical axis alignment on the same axis, and a wireless optical transmission apparatus on a desk or the like locates the master device at a high speed by a first direction detection section, and locates the master device at a high accuracy by a second direction detection section, thereby downscaling the apparatus without raising cost, and able to perform the high-speed and high-accuracy adjustment of the optical axis in an optical communication.

CITATION LIST

Patent Literature

[Patent Literature 1] Japanese Laid-Open Patent Publication No. 2001-245253

[Patent Literature 2] Japanese Laid-Open Patent Publication No. 2004-349797

SUMMARY OF THE INVENTION

In the above method making use of the cache memory, an amount of memory used for caching is, in general, limited, and thus, to efficiently make use of the cache memory, new information is recorded by overwriting an area in order starting from an area having stored therein information having the oldest cached time or an area having the least accessed information, and previous information is subsequently deleted. In a case where a user takes images while moving, the captured light source changes with the change of the imaging range and the same light source is also repeatedly captured. By caching the once-captured light source, the communication cost or time which takes for information display at re-acquirement can be reduced. However, conventional cache algorithms (such as FIFO and LILO) are effective only under specific conditions such as a user moving in a certain direction.

For example, in a case where priority levels are given to information so that older information in time has a lower priority level (likely to be deleted from the cache) among the cached information, if a camera operator pauses in taking images in the middle of taking images of a city while moving in the right direction, a priority level of information regarding an information source farther spaced in the left direction from the position at which the image taking is paused is lowered. Therefore, when the image taking resumes subsequently at a position on the left side from the position of the image taking before the pause and the camera operator takes images while moving again in the right direction, a priority level of information regarding an information source closer to the imaging range is lower than a priority level of information regarding an information source farther from the imaging range.

Therefore, even though it is information regarding an information source close to the imaging range, if an image of the information is captured early in the sequence, the information ends up being deleted immediately from the cache memory despite that the image source may be about to enter the imaging range, which introduces a very undesirable situation in which, even when the image source re-enters the imaging range, the same communication time and cost as for the first image taking are required to display the information. In a case where image taking is repeated on a beach side with pauses during the image taking in this manner, the situation may end up being unable to efficiently make use of the cache memory.

When such a situation occurs, the communication processing occurs to re-acquire the once-acquired information, and thus possibility of wait time increases to reduce responsiveness or memory efficiency, ending up degrading the performance of the entire apparatus. In addition, if an attempt is made to ensure sufficient performance even in such a situation, there occurs a problem that the apparatus needs to include a highly efficient configuration providing high speed throughput, which increases cost.

Also, in the wireless optical transmission system in Patent Literature 2, if it is assumed that the system is applied to a mobile device, which is held in a hand and used by a user while the user is walking, an orientation or position of a light-receiving section dynamically varies, and therefore stepwise alignment of the optical axis becomes very difficult. Thus, the wireless optical transmission system in Patent Literature 2 is not practical in such a situation.

Therefore, an object of the present invention is to provide an information display apparatus, a display control integrated circuit, and a display control method which allow reduction of user's wait time for display and reduction of communication cost by increasing a cache hit rate of a once-captured light source.

The present invention is directed to an information display apparatus, a display control integrated circuit, and a display control method. In order to achieve the above object, the information display apparatus of the present invention is an information display apparatus for performing a visual light communication and superimposing light source information transmitted from a light source onto images captured in time sequence for display on a screen, the information display apparatus including: an imaging section for capturing an image in an imaging range; a cache memory sequentially caching the light source information transmitted from the light source in the image; a priority level setting section for setting a higher priority level to the light source information, cached in the cache memory, in order starting from a light source closest to a current imaging range; and a communications information processing section for deleting the light source information, cached in the cache memory, in order starting from light source information having a lowest priority level.

Preferably, in the information display apparatus, the priority level setting section may determine whether the light source is close to the current imaging range, based on whether a value of a distance from a center of the current imaging range to a center of the light source is small or whether a value obtained by quantizing the distance is small.

Preferably, the information display apparatus may further include a movement characteristic projection section for projecting movement characteristics, based on change in area or coordinates of the light source in the image, and the priority level setting section corrects central coordinates of the light source, based on the movement characteristics, and determines whether the light source is close to the current imaging range, based on whether a distance from the center of the current imaging range to the corrected central coordinates of the light source is small.

Preferably, the information display apparatus may also display, on the screen, light source information of a light source which has a high priority level and is outside the current imaging range among the light sources cached in the cache memory.

In addition, in order to achieve the above object, the information display method of the present invention is an information display method for performing a visual light communication and superimposing light source information transmitted from a light source onto images captured in time sequence for display on a screen, the information display method including the steps of: capturing an image in an imaging range; sequentially caching, in a cache memory, the light source information transmitted from the light source in the image; setting a higher priority level to the light source information, cached in the cache memory, in order starting from a light source closest to a current imaging range; and deleting the light source information, cached in the cache memory, in order starting from light source information having a lowest priority level.

Also, in order to achieve the above object, the integrated circuit of the present invention is an integrated circuit for use in an information display apparatus for performing a visual light communication and superimposing light source information transmitted from a light source onto images captured in time sequence for display on a screen, the integrated circuit including: a cache memory sequentially caching the light source information transmitted from the light source in an image in an imaging range; a priority level setting section for setting a higher priority level to the light source information, cached in the cache memory, in order starting from a light source closest to a current imaging range; and a communications information processing section for deleting the light source information, cached in the cache memory, in order starting from light source information having a lowest priority level.

As described above, according to the present invention, the information display apparatus, the display control integrated circuit, the display control program, and the display control method, which allow reduction of the user's wait time for display and the reduction of the communication cost by increasing the cache hit rate of the once-captured light source, can be provided.

BRIEF DESCRIPTION OF THE DRAWINGS

FIG. 7 is a diagram (No. 1) showing an outline of a use case for a cache priority level.

FIG. 8 is a diagram (No. 2) showing an outline of a use case for the cache priority level.

FIG. 9 is a diagram (No. 3) showing an outline of a use case for the cache priority level.

FIG. 16 is a diagram showing an example of a screen, displayed on a display device 300, in which information for display, regarding a source that is outside an imaging range, extracted by a communication information processing section 226 is synthesized onto outside of a frame of an image captured by an imaging section 210.

DETAILED DESCRIPTION OF THE INVENTION

First Embodiment

<Outline>

An information display apparatus 200 in a first embodiment caches a position of a light source (a relative distance thereto from the center of a shooting angle of view is calculated) and contents of communication obtained from the light source, and shooting conditions (a shooting angle, a shooting direction, a direction of movement, an amount of movement), and, while continuously updating the position of the light source, the information display apparatus 200 gives a high cache priority level to information regarding a source, among once-captured sources, that is close to the shooting angle of view and is at a position outside the imaging range but from which the source is close to re-entering the imaging range. According to the first embodiment, the responsiveness for the information to be superimposed onto a display image can be improved and cache usage rate can be improved.

<Configuration>

Figure 1:
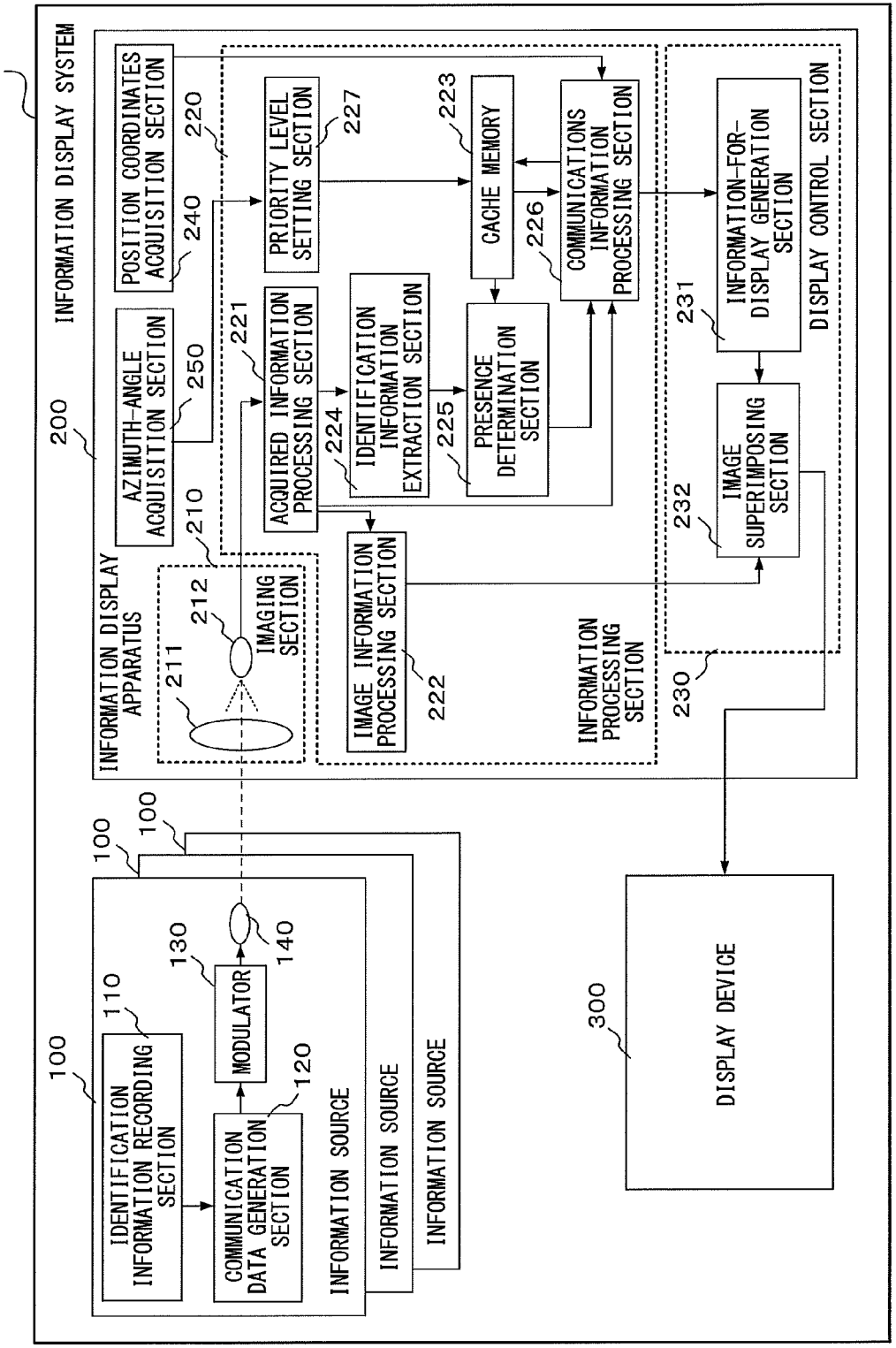
FIG. 1 is a diagram showing an outline of a functional configuration of an information display system 1 in a first embodiment.

FIG. 1 is a diagram showing an outline of a functional configuration of an information display system 1 in the first embodiment.

The information display system 1 shown in FIG. 1 includes an information source 100, an information display apparatus 200, and a display device 300.

The information source 100 is a stationary electronic device attached to a shelf for goods at a store, an advertising display in a city, or the like, and has a function to transmit information for display as light source information. The information source 100 includes an identification information recording section 110, a communication data generation section 120, a modulator 130, and a transmitter light source 140.

The information display apparatus 200 is, for example, a mobile electronic device, such as a digital camera or a camera-equipped mobile phone, which includes an image capturing function and has a function to obtain information for display by a wireless optical communication and superimpose the information for display onto a captured video for display. The information display apparatus 200 includes an imaging section 210, an information processing section 220, a display control section 230, a position coordinates acquisition section 240, and an azimuth-angle acquisition section 250.

The display device 300 is an image display device such as a liquid crystal monitor.

The identification information recording section 110 records individual identification information uniquely identifying an information source. Here, there is a case where the identification information recording sections 110 of adjacent plurality of information sources 100 record the same individual identification information. It is assumed that, in such a case, the plurality of information sources 100 recording the same individual identification information transmit the same information at the same point in time, and can be handled as the same information source.

The communication data generation section 120 generates information for display to be displayed in the information display apparatus 200.

The modulator 130 converts the individual identification information recorded in the identification information recording section 110 and the information for display generated by the communication data generation section 120 into electric signals.

The transmitter light source 140 is a device operable to transmit light having relatively high intensity higher than a certain degree, such as an LED or a fluorescent light, and uses the electric signals converted by the modulator 130 to transmit, by the intensity of the light, communication information, which includes the individual identification information and the information for display, to the information display apparatus 200.

The imaging section 210 captures images in time sequence, and includes a lens 211 which adjusts the imaging conditions of incoming light and an image sensor 212 which generates photoelectric conversion information by converting the intensity of light acquired through the lens 211 into an electric signal and subsequently outputs the electric signal to the information processing section 220, thereby capturing an image. It should be noted that the image sensor is used as a photoelectric conversion element, but not limited thereto. The photoelectric conversion element may be any that can convert the intensity of light into an electric signal as brightness information. For example, the imaging section 210 may include photodiodes arrayed on a two-dimensional plane, instead of the image sensor 212.

The information processing section 220 identifies all source regions, in which the brightness changes over time by predetermined patterns, in the image captured by the imaging section 210, and extracts the communication information for each source region from the identified one or a plurality of source regions, based on the change of brightness for each source region. The information processing section 220 includes an acquired information processing section 221, an image information processing section 222, a cache memory 223, an identification information extraction section 224, a presence determination section 225, a communication information processing section 226, and a priority level setting section 227.

The display control section 230 superimposes the information for display, which is included in the communication information for each region extracted by the information processing section 220, onto the image captured by the imaging section 210, adjusts the brightness, size, and the like, and displays the resultant image on the external display device 300. The display control section 230 includes an information-for-display generation section 231 and an image superimposition section 232.

The position coordinates acquisition section 240 includes a function whereby, like GPS, it can acquire an absolute positioning, for example, and acquires current shooting coordinates.

The azimuth-angle acquisition section 250 includes a function whereby, like a gyroscope, it can acquire azimuth, angle, and the like, for example, and acquires a current shooting direction.

The acquired information processing section 221 extracts image information to be used in image analysis, based on the photoelectric conversion information generated by the image sensor 212 of the imaging section 210, and outputs the extracted image information to the image information processing section 222. The acquired information processing section 221 also identifies a light source of the information source to set a source region for each light source, extracts corresponding brightness information indicative of change of brightness in time sequence for each set source region, and outputs region information indicative of the set source region and the extracted brightness information in association to the identification information extraction section 224 and the communication information processing section 226.

The image information processing section 222 applies adjustment for display to the image information extracted by the acquired information processing section 221, providing with image information processing, such as color space conversion and view angle adjustment which are necessary for outputting the image on the screen, and outputs the resultant image information to the image superimposition section 232.

The cache memory 223 holds a set of information for display corresponding to an information source in a previously-captured image and individual identification information uniquely identifying the information source.

The identification information extraction section 224 extracts the individual identification information for each source region by recognizing the change of brightness in time sequence indicated by the brightness information, extracted by the acquired information processing section 221, as a bit of either of '0' and '1' for each source region indicated by the region information extracted by the acquired information processing section 221.

The presence determination section 225 determines whether each of the individual identification information extracted by the identification information extraction section 224 is in the cache memory 223.

Regarding the individual identification information determined, by the presence determination section 225, not to be present, the communication information processing section 226 extracts corresponding information for display by recognizing the change of brightness in time sequence indicated by the brightness information, extracted by the acquired information processing section 221, as a bit of either of '0' and '1' for each source region indicated by the region information extracted by the acquired information processing section 221, and saves the information for display paired with corresponding identification information in the cache memory 223. Regarding the individual identification information determined, by the presence determination section 225, to be present, the communication information processing section 226 extracts corresponding information for display from the cache memory 223.

In addition, the presence determination section 225 determines whether individual identification information other than the individual identification information extracted by the identification information extraction section 224 is in the cache memory 223.

If the presence determination section 225 determines that the individual identification information other than the individual identification information extracted by the identification information extraction section 224 is in the cache memory 223, the priority level setting section 227 sets a cache priority level for each set held in the cache memory 223, depending on how close a corresponding source region is to the shooting angle of view. The cache priority level serves as an index whereby order wherein the set is deleted is determined. The details will be described in below sections Operation and Use Case.

The information-for-display generation section 231 determines information for superimposition and a display mode thereof, based on the information for display for each source region extracted by the communication information processing section 226, and outputs the information for superimposition and the display mode to the image superimposition section 232.

The image superimposition section 232 superimposes the information for superimposition determined by the information-for-display generation section 231 onto the image information to which the image information processing is provided by the image information processing section 222, and outputs the resultant image information to the display device 300 to display an image.

The image superimposition section 232 may superimpose the information for display for each source region in association with a position of the source region. More specifically, for example, the image superimposition section 232 superimposes, onto the position of the source region, the corresponding information for display, connects between the position of the source region and the corresponding information for display with an arrowed line or the like, or generates a balloon from the position of the source region and lists the corresponding information for display in the balloon.

Figure 2:
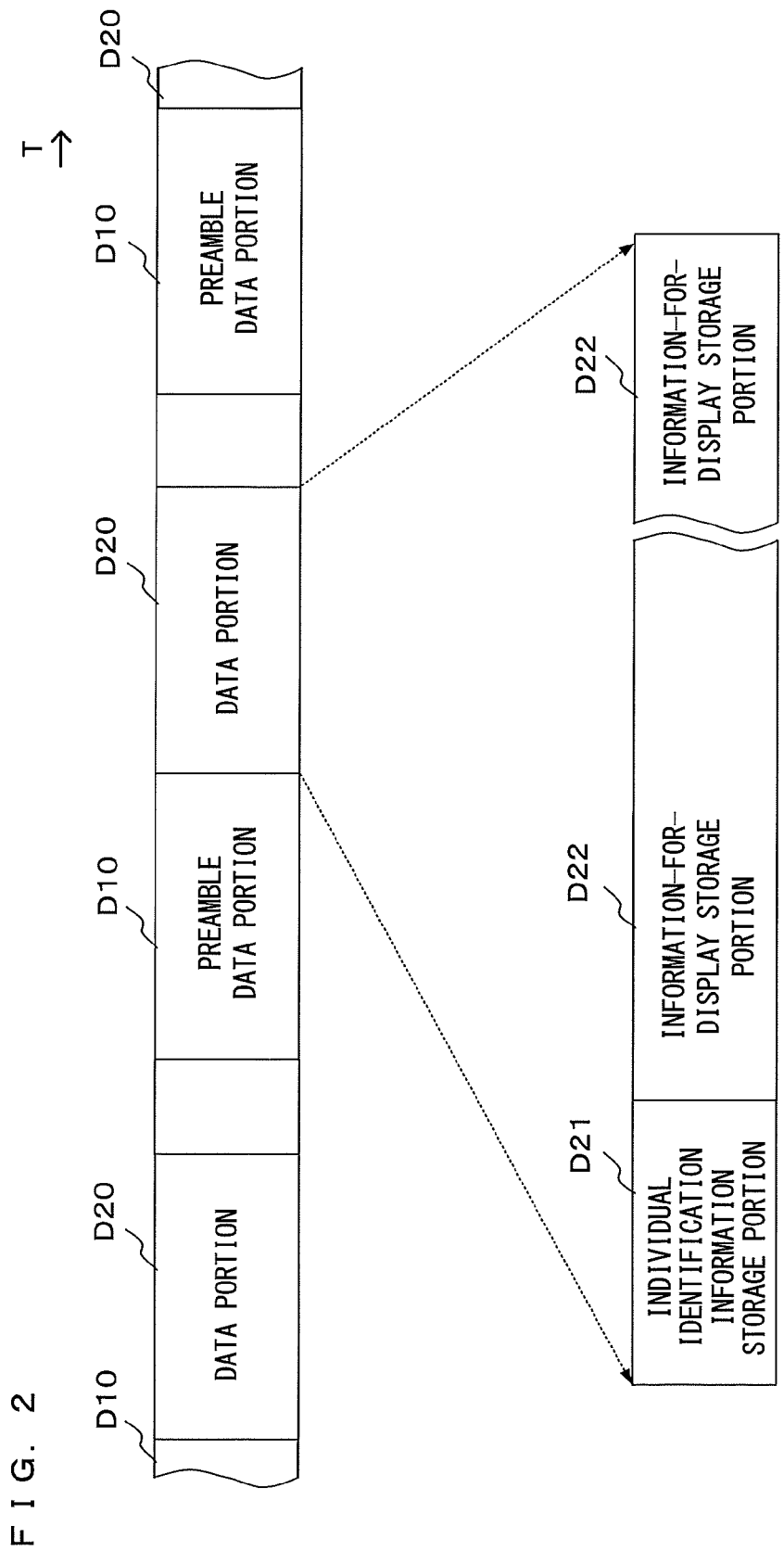
FIG. 2 is a diagram showing an example of a data format of communication information transmitted by intensity of light from an information source 100 to an information display apparatus 200.

FIG. 2 is a diagram showing an example of a data format of the communication information transmitted by the intensity of light from the information source 100 to the information display apparatus 200. Here, "→" in the figure denotes a time T progressing direction.

As shown in FIG. 2, the data format of the communication information includes a preamble data portion D10 and a data portion D20, and is repeatedly and cyclically outputted from the information source 100.

Data stored in the preamble data portion D10 is data whereby the communication information which includes the information for display is recognized as such in the information display apparatus 200. The data includes preamble data which is fixed data indicative of a start point of the data portion D20.

Data stored in the data portion D20 includes an individual identification information storage portion D21 and an information-for-display storage portion D22.

Data stored in the individual identification information storage portion D21 is the individual identification information to be extracted by the identification information extraction section 224.

Data stored in the information-for-display storage portion D22 is the information for display to be extracted by the communication information processing section 226.

<Operation>

Figure 3:
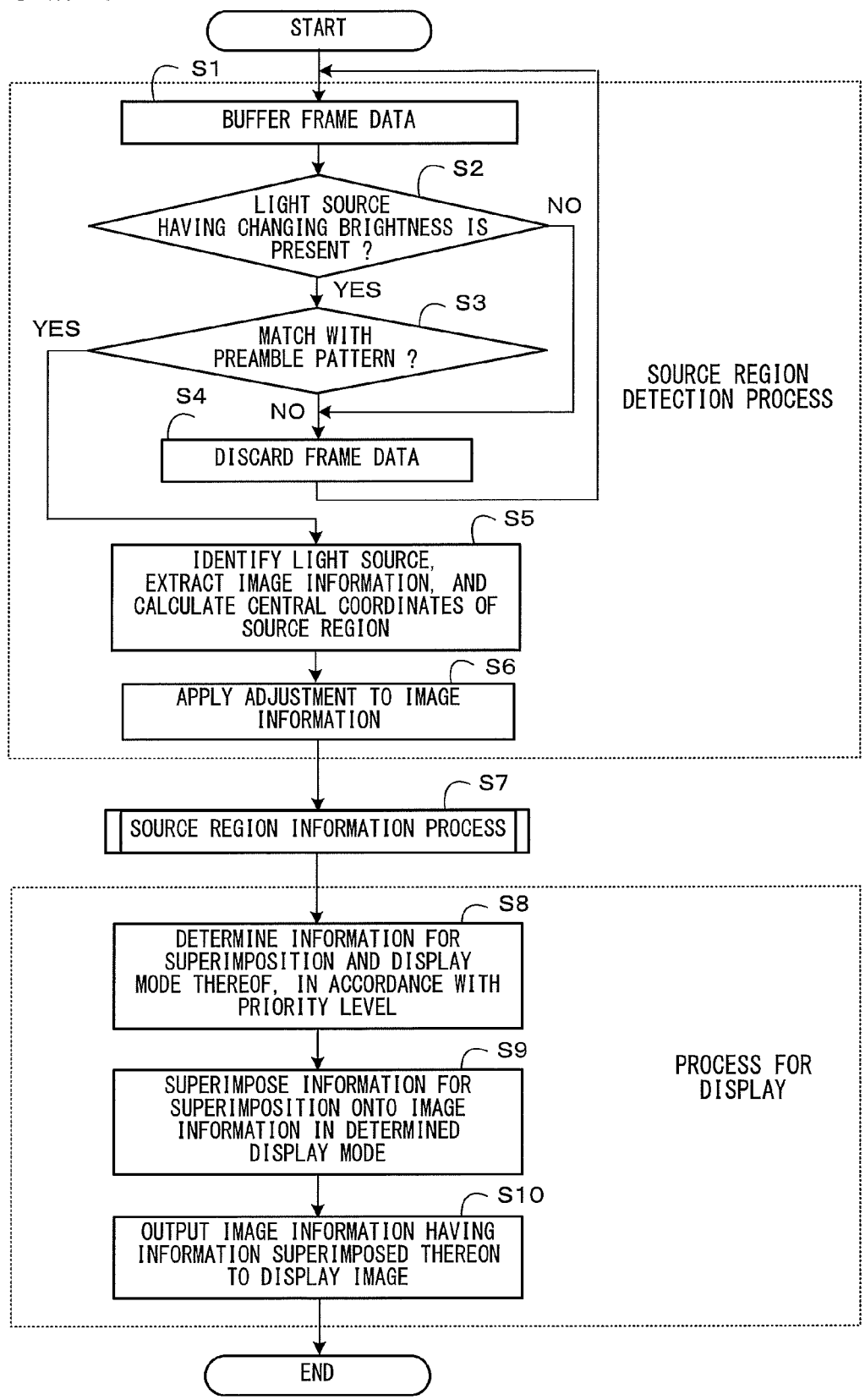
FIG. 3 is a diagram showing a sequence, in the present embodiment, starting from a source region detection process through a source region information process to a process for display whereby information for display is superimposed onto a captured image for display.

FIG. 3 is a diagram showing a sequence, in the present embodiment, starting from a source region detection process through a source region information process to a process for display whereby the information for display is superimposed onto the captured image for display.

Step S1 to step S7 are a sequence of the source region detection process.

(1) The acquired information processing section 221 buffers a plurality of frame data the number of bits of which corresponds to the number of bits of the preamble data portion D10, provided that the image captured by the image sensor 212 is each frame data (step S1).

(2) It is determined whether a light source having changing brightness is in the plurality of frame data buffered in step S1 (step S2).

(3) If the light source having changing brightness is present (step S2: YES), the acquired information processing section 221 compares between the buffered frame data and a preamble pattern in the preamble data portion D10 to determine whether these two match each other (step S3).

(4) If no light source having changing brightness is present (step S2: NO), and if the buffered frame data and the preamble pattern do not match each other (step S3: NO), the acquired information processing section 221 determines that no communication information is present and discards the buffered frame data, and the process returns to the frame data buffering (step S1) (step S4).

(5) If the buffered frame data and the preamble pattern match each other (step S3: YES), the acquired information processing section 221 identifies that the light source having changing brightness is the light source transmitting the communication information which includes the information for display, and extracts the image information to be used in the image analysis. In addition, current central coordinates (Px, Py), on an image plane, of the source region transmitting the frame data is calculated and temporarily stored together with the brightness information (step S5).

(6) The image information processing section 222 applies adjustment for display to the extracted image information (step S6).

(7) The source region information process is performed for each source region and the information for display is outputted (step S7). Step S7 is a subroutine performing the source region information process and the details are separately described in FIG. 4.

Step S8 to step S10 are a sequence of a superimposition process whereby the information for display is superimposed onto the image information and displayed.

(8) The information-for-display generation section 231 determines information for superimposition and the display mode thereof, based on the information for display for each source region outputted of step S7 (step S8).

(9) The image superimposition section 232 superimposes the information for superimposition, determined in step S8, onto the image information having applied thereto the adjustment for display in step S6 (step S9).

(10) The image information having the information superimposed thereon in step S9 is outputted to the display device 300 to display a corresponding image (step S10).

Figure 4:
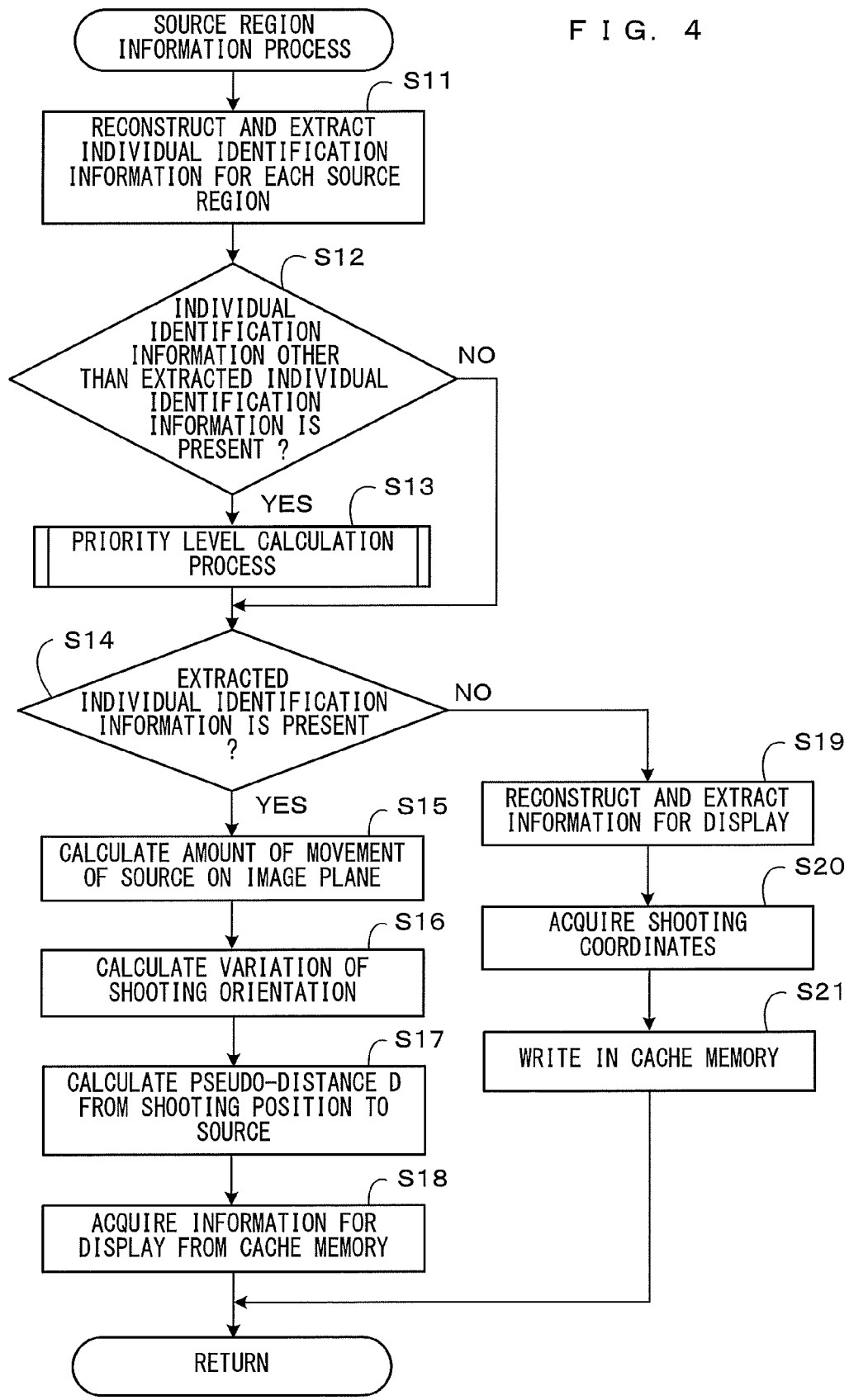
FIG. 4 is a diagram showing a sequence of a subroutine performing the source region information process of step S7.

FIG. 4 is a diagram showing a sequence of a subroutine performing the source region information process in step S7.

(1) The identification information extraction section 224 subsequently acquires the number of bits of data corresponding to the number of bits of the individual identification information storage portion D21 shown in FIG. 2, for each source region indicated by the region information extracted by the acquired information processing section 221, to reconstruct and extract the individual identification information (ID) (step S11). The reconstruction process described herein is by way of example and, if the protocol for the optical communication differs, a corresponding reconstruction process is performed.

(2) The presence determination section 225 determines whether the individual identification information other than the individual identification information extracted by the identification information extraction section 224 in step S11 is in the cache memory 223 (step S12).

(3) If the individual identification information other than the extracted individual identification information is present (step S12: YES), a priority level calculation process for the cache memory is performed (step S13).

Figure 5:
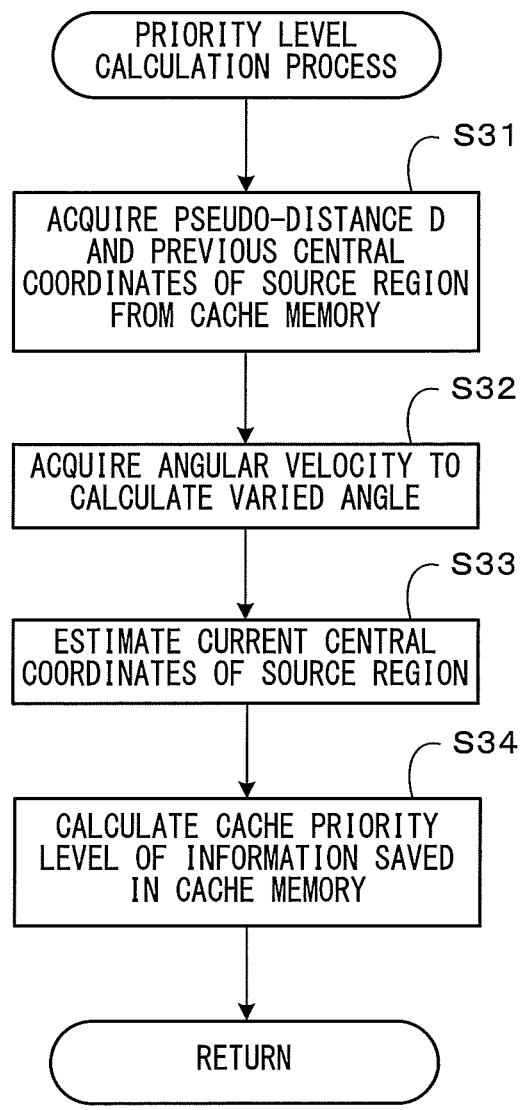
FIG. 5 is a diagram showing a sequence of a subroutine performing a priority level calculation process for the cache memory of step S18.

Step S13 is a subroutine performing the cache memory priority level calculation process and the details are separately described in FIG. 5.

(4) After the completion of the cache memory priority level calculation process (step S13) or if no individual identification information other than the extracted individual identification information is present (step S12: NO), the presence determination section 225 determines whether each of the individual identification information extracted by the identification information extraction section 224 in step S11 is in the cache memory 223 (step S14).

(5) If the individual identification information is present (step S14: YES), previous central coordinates of the source region associated with the individual identification information are acquired from the cache memory 223, and the amount of movement (dx in x-axis direction and dy in y-axis direction) of the source on the image plane is calculated based on a difference between the previous central coordinates of the source region and the current central coordinates of the source region calculated in step S5 of FIG. 3 (step S15).

(6) Angular velocity information (horizontal angular velocity ωx and vertical angular velocity ωy) of the shooting orientation is acquired from the azimuth-angle acquisition section 250, and variation (horizontal angle θx=ωx×t and vertical angle θy=ωy×t) of the shooting orientation is calculated based on the angular velocity information and a shooting interval "t" (step S16).

Here, "shooting orientation" means a direction of a normal vector of the lens 211 attached to the information display apparatus 200. In step S16, an angle of movement (the variation) relative to the normal vector in the previous shooting as a reference is represented by the horizontal angle θx and the vertical angle θy.

(7) Using the triangulation method, a pseudo-distance D (=dx÷tan θx=dy÷tan θy) from the shooting position to the source is calculated based on the amount of movement on the image plane calculated in step S15 and the variation of the shooting orientation calculated in step S16 (step S17).

(8) The information for display associated with the individual identification information is acquired from the cache memory 223 (step S18).

Here, the distance accuracy can also be enhanced by correction of the pseudo-distance D between the shooting position and the source by acquiring the shooting coordinates (latitude X, longitude Y, and altitude Z) from the position coordinates acquisition section 240 and, using this, calculating position variation from the previous shooting coordinates.

(9) If no individual identification information is present (step S14: NO), the identification information extraction section 224 subsequently acquires the number of bits of data corresponding to the number of bits of the information-for-display storage portion D22 shown in FIG. 2 to reconstruct and extract the information for display (step S19).

(10) The communication information processing section 226 acquires the shooting coordinates (the latitude X, the longitude Y, and the altitude Z) from the position coordinates acquisition section 240 (step S20).

(11) The communications information processing section writes in the cache memory 223 a set of: the individual identification information extracted in step S11; the information for display extracted in step S19; the current central coordinates of the source region calculated in step S5 of FIG. 3; and the shooting coordinates acquired in step S20, as information regarding a new source (step S21).

Here, if there is room in the cache memory 223, the communications information processing section writes the information regarding the new source in the room, and if there is no room in the cache memory 223, the communications information processing section writes the information so that the set is deleted from the cache memory in order starting from a set having the lowest cache priority level set in step S18. For example, the sets may be stored in a real area or a virtual area of the cache memory so as to be arranged in order starting from a set having the lowest cache priority level to a set having the highest cache priority level, and the new information may be subsequently written over an area in order starting from an area having stored therein the set having the lowest cache priority level.

FIG. 5 is a diagram showing a sequence of a subroutine performing the cache memory priority level calculation process in step S18.

(1) The priority level setting section 227 acquires, from the cache memory 223, the previous central coordinates of the source region and the pseudo-distance D at which the source region to be determined in step S14 is captured (step S31).

(2) The priority level setting section 227 acquires the angular velocity of a current shooting orientation from the azimuth-angle acquisition section 250, and, using the shooting interval "t", calculates the varied angle (=angular velocity× shooting interval) of the shooting orientation (step S32).

(3) The priority level setting section 227 estimates the current central coordinates of the source region by calculating, based on the pseudo-distance D and the varied angle of the shooting orientation, an amount of movement (=pseudo-distance×tan(varied angle)) of the source on the image plane by the triangulation method, and adding the amount of movement to the previous central coordinates of the source region acquired from the cache memory 223 (step S33).

It should be noted that, here, the accuracy in estimating the current central coordinates of the source region can also be enhanced by the enhancement of the distance accuracy by acquiring the shooting coordinates (the latitude X, the longitude Y, the altitude Z) from the position coordinates acquisition section 240, and, using this, calculating the position variations from the previous shooting, and modifying the pseudo-distance D from the shooting position to the source.

(4) The cache priority level of the information saved in the cache memory 223 is calculated based on the relationship between the estimated current central coordinates of the source region and the imaging range of the information display apparatus 200. The details are described in FIG. 6 (step S34).

It should be noted that, while, in the present embodiment, the estimated current central coordinates of the source region are obtained by the application of the triangulation method using the previous central coordinates of the source region on the image plane and the variation of the shooting orientation, the central coordinates of the current source region may be estimated by changing the process sequences or the combination thereof, or adding information, such as elevation/depression information, and continuous movement information.

Figure 6:
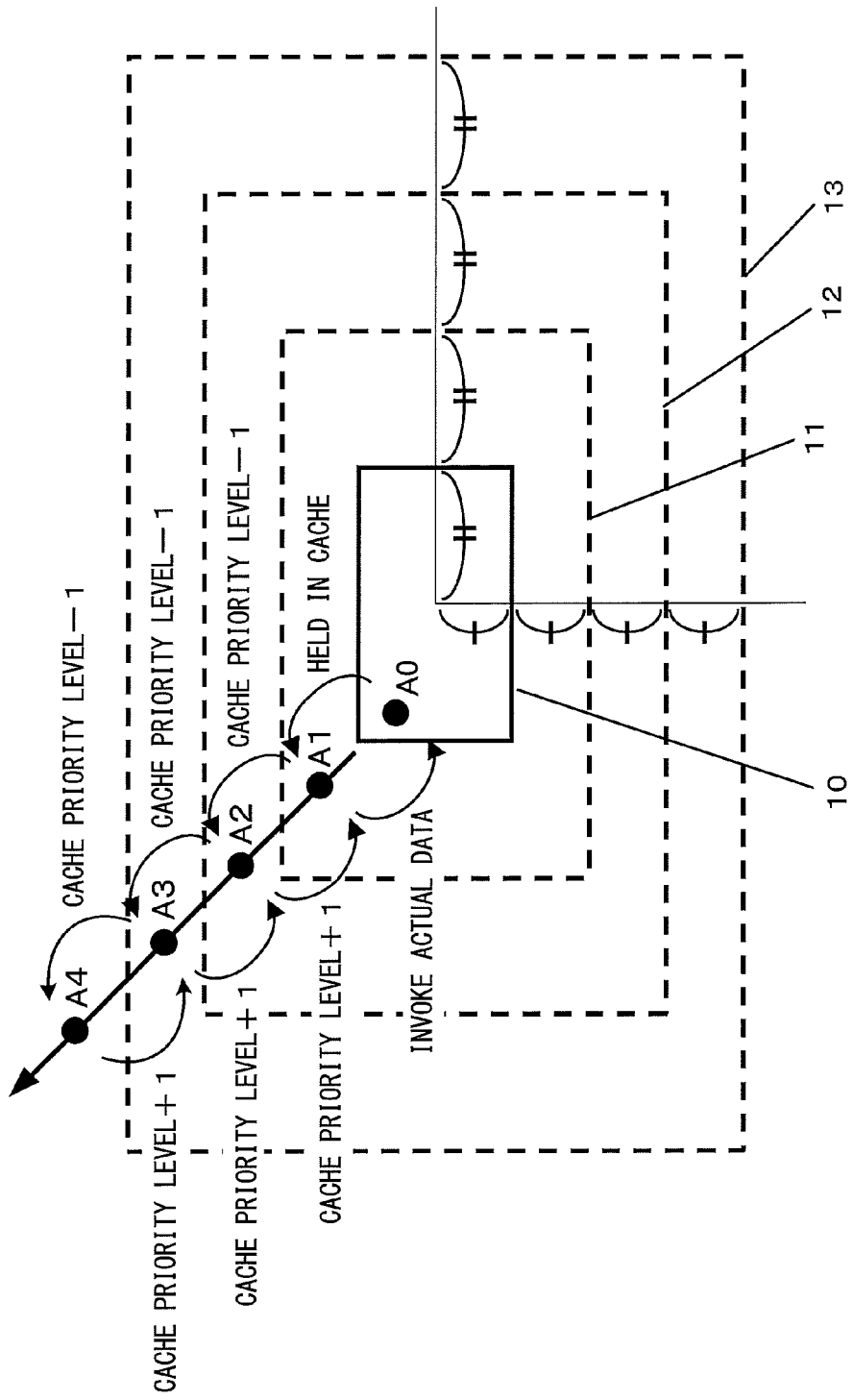
FIG. 6 is a diagram showing an outline of the priority level calculation process of step S34.

FIG. 6 is a diagram showing an outline of the priority level calculation process of step S34.

The following will describe the outline of the priority level calculation process with reference to FIG. 6.

In accordance with how far the estimated central coordinates of the source region obtained in step S33 are away from the imaging region, the priority level setting section 227 gives the cache priority level to corresponding information. More specifically, for example, as shown in FIG. 6, the priority level setting section 227 virtually sets a first priority level region 11 that is twice as large as the imaging region 10 in the X direction and the Y direction relative to the center of the imaging region 10, and gives the highest cache priority level to information regarding a source A1 which is in the first priority level region 11 and is outside the imaging region 10.

Also, the priority level setting section 227 virtually sets a second priority level region 12 that is three times as large as the imaging region 10 in the X direction and the Y direction relative to the center of the imaging region 10, and gives the second highest cache priority level to information regarding a source A2 which is in the second priority level region 12 and is outside the first priority level region 11.

Also, the priority level setting section 227 virtually sets a third priority level region 13 that is four times as large as the imaging region 10 in the X direction and the Y direction relative to the center of the imaging region 10, and gives the third highest cache priority level to information regarding a source A3 that is in the third priority level region 13 and is outside the second priority level region 12.

Also, the priority level setting section 227 gives the lowest cache priority level to information regarding a source A4 which is outside the third priority level region 13.

Here, while there are four cache priority levels, the number of levels can be changed accordingly, depending on the implementation.

In actual operation, the cache priority level downgrades as the estimated central coordinates of each source region are spaced from the imaging region by a reference distance, and, on the contrary, the cache priority level upgrades as the estimated central coordinates of each source region become closer to the imaging region by the distance. That is, the cache priority level is determined based on a value obtained by quantizing the distance from the angle of view to the source region by a unit of the reference distance. The reference distance can be changed accordingly, depending on the implementation.

More specifically, when the image capturing is continuously conducted, if any of the sources captured in the imaging region 10 at time t0 seconds is outside the imaging region at the image capturing after time t1 seconds, and the estimated central coordinates of the corresponding source region are located at the position A1, the cache priority level "4", which is the highest, is given to the information of the source. Subsequently, at the image capturing after time t2 seconds, if the estimated central coordinates of the source region goes beyond a frame of the first priority level region 11, and has moved from the position A1 to the position A2, the cache priority level is decremented to be updated to "3". In this manner, for each time the estimated central coordinates of the source region move away from the imaging region beyond the frame of the priority level region at each image capturing, moving from the position A1 to the position A2, from the position A2 to the position A3, or from the position A3 to the position A4, the cache priority level of the information of the corresponding source is decremented. On the contrary, for each time the estimated central coordinates of the source region become closer to the imaging region beyond the frame of the priority level region, moving from the position A4 to the position A3, from the position A3 to the position A2, or from the position A2 to the position A1, the cache priority level of the information of the corresponding source is incremented. Also, if the source region moves from a position A0 in the imaging region 10 to the position A1, the actual data is held in the cache memory 223 and the highest cache priority level is given. Also, when the source region moves from the position A1 to the position A0 in the imaging region 10, the actual data is invoked from the cache memory 223.

Also, when the image capturing is resumed in a state in which the information regarding the source is stored in the cache memory 223, such as when the image capturing is resumed after pause, the cache priority level is updated with respect to all the information regarding each source held in the cache memory 223 at the resume of the image capturing, by calculating the number of times the source region would have moved beyond the boundary between priority level regions during pause, or by obtaining the priority level region to which the estimated central coordinates of the source region belong, and the like.

The thus given cache priority level represents a degree of likelihood of information regarding each source stored in the cache memory 223 being re-captured. According to the present embodiment, among the information regarding the captured sources, the cache priority level remains high with respect to the information regarding the source that is at a position where it is easy for an operator to take an image thereof, such as near the imaging range.

Therefore, the cache priority level can be an effective index whereby order of deletion of the information regarding the sources stored in the cache memory 223 is determined when information regarding a new source is written to the cache memory 223 in step S21 of FIG. 4.

<Use Case>

The cache priority level can be used as follows.

FIGS. 7 to 12 each show an outline of a use case for the cache priority level.

FIGS. 7 to 12 show the positional relationship between the imaging region and the source, and the way the cache priority level of the information regarding the source held in the cache memory varies in time sequence in the case where the camera operator uses the information display apparatus 200 to take images of his/her periphery at a fixed position.

Here, the imaging region 20 has a size of 1920×1080 pix (pixel), and a cache priority level variance frame 21 has a size of 3840×2160 pix centered on the imaging region, and a cache priority level variance frame 22 has a size of 5760×3240 pix centered on the imaging region. Here, it is given that there are three cache priority levels, and up to 4 pieces of information regarding sources can be held. Also, it is given that seven sources A to G are in the periphery of the imaging region 20 and each source is motionless.

(1) FIG. 7 shows a state when the image capturing starts. In FIG. 7, the source A and the source B are in the imaging region 20, and the cache memory 30 is empty. Here, information a regarding the source A is acquired from the source A, and information b regarding the source B is acquired from the source B.

(2) Next, a state obtained by the camera operator sliding the information display apparatus 200 in the right direction is shown in FIG. 8. In FIG. 8, the source A and the source C are in the imaging region 20. Here, since the source C has newly entered the imaging region 20, information c regarding the source C is acquired from the source C. In addition, the source B which is in the imaging region 20 in FIG. 7 is outside the imaging region in FIG. 8, and therefore, as shown in FIG. 8, the information b regarding the source B acquired from the source B is saved in the cache memory 30. When saving the information b, the cache priority level "3", which is the highest cache priority level, is given to the information b.

(3) Furthermore, a state obtained by the camera operator sliding the information display apparatus 200 in the upward direction is shown in FIG. 9. In FIG. 9, only the source D is in the imaging region 20. Here, since the source D has newly entered the imaging region 20, information d regarding the source D is acquired from the source D. In addition, the source A and the source C which are in the imaging region 20 in FIG. 8 are outside the imaging region in FIG. 9, and therefore, as shown in FIG. 9, the information a regarding the source A acquired from the source A and the information c regarding the source C acquired from the source C are saved in the cache memory 30. When saving the information a and the information c, since the estimated central coordinates of the source B and the source C are in the cache priority level variance frame 21, the cache priority level "3" is given to the information a and the information c. On the other hand, since the estimated central coordinates of the source A are not in the cache priority level variance frame 21 and are in the cache priority level variance frame 22, the cache priority level "2" is given to the information a.

Figure 10:
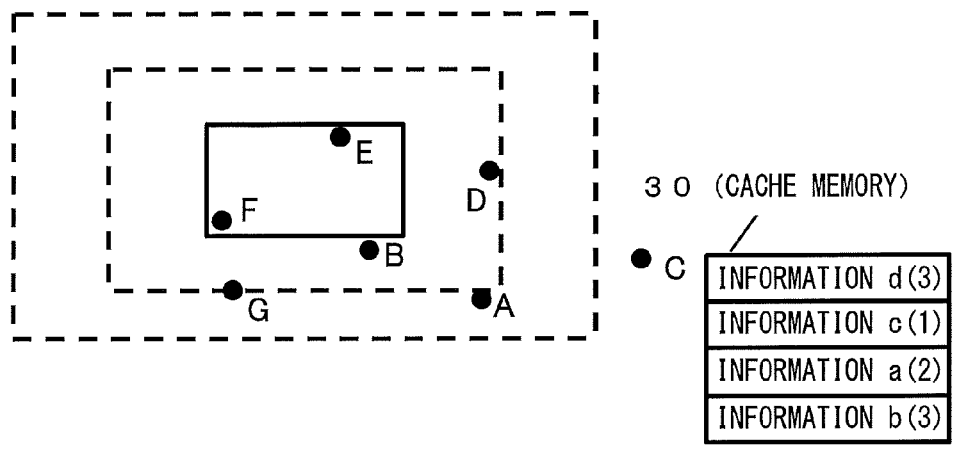
FIG. 10 is a diagram (No. 4) showing an outline of a use case for the cache priority level.

(4) Furthermore, a state obtained by the camera operator sliding the information display apparatus 200 in the left direction is shown in FIG. 10. In FIG. 10, the source E and the source F are in the imaging region 20. Here, since the source E and the source F have newly entered the imaging region 20, information e regarding the source E is acquired from the source E and information f regarding the source F is acquired from the source F. In addition, the source D which is in the imaging region 20 in FIG. 9 is outside the imaging region in FIG. 10, and therefore, as shown in FIG. 10, the information d regarding the source D acquired from the source D is saved in the cache memory 30. When saving the information d, since the estimated central coordinates of the source B and the source D are in the cache priority level variance frame 21, the cache priority level "3" is given to the information b and the information d. On the other hand, since the estimated central coordinates of the source A are not in the cache priority level variance frame 21 and are in the cache priority level variance frame 22, the cache priority level "2" is given to the information a. Since the estimated central coordinates of the source C are not in the cache priority level variance frame 22, the cache priority level "1" is given to the information c.

Figure 11:
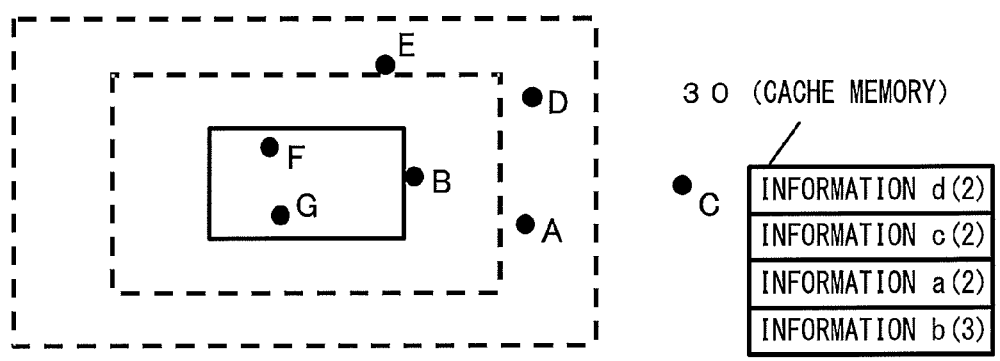
FIG. 11 is a diagram (No. 5) showing an outline of a use case for the cache priority level.

(5) Furthermore, a state obtained by the camera operator sliding the information display apparatus 200 in the downward direction is shown in FIG. 11. In FIG. 11, the source F and the source G are in the imaging region 20. Here, since the source G has newly entered the imaging region 20, information g regarding the source G is acquired from the source G. In addition, the source E which is in the imaging region 20 in FIG. 10 is outside the imaging region in FIG. 11, and therefore, as shown in FIG. 11, the information e regarding the source E acquired from the source E is saved in the cache memory 30. However, because there are already four pieces of information regarding the sources saved in the cache memory 30, and thus there is no available area. Therefore, a process for searching the source having the lowest priority level given thereto is performed to determine information to be deleted. Since the estimated central coordinates of the source B are in the cache priority level variance frame 21, the cache priority level "3" is given to the source B. On the other hand, since the estimated central coordinates of the source A, the source D, and the source E are not in the cache priority level variance frame 21, and are in the cache priority level variance frame 22, the cache priority level "2" is given to the source A, the source D, and the source E. Since the estimated central coordinates of the source C are not in the cache priority level variance frame 22, the cache priority level "1" is given to the source C. Therefore, it is determined that the information c regarding the source C having the lowest priority level is the information to be deleted, and the information e is written over the area in which the information c is saved in the cache memory 30.

Figure 12:
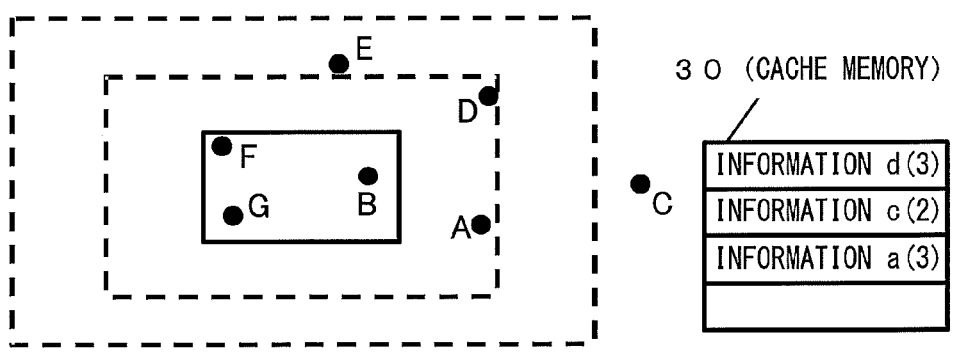
FIG. 12 is a diagram (No. 6) showing an outline of a use case for the cache priority level.

(6) Furthermore, a state obtained by the camera operator sliding the information display apparatus 200 in the right direction is shown in FIG. 12. In FIG. 12, the source F, the source G and the source B are in the imaging region 20. Here, although the source B has newly entered the imaging region 20, the information b regarding the source B has been saved in the cache memory 30. Therefore, the information b is acquired from the cache memory 30. On the other hand, since the estimated central coordinates of the source A and the source D have entered the cache priority level variance frame 21A, the cache priority level of each of the source A and the source D is incremented and the cache priority level "3" is given to the source A and the source D.

It should be noted that function blocks of the acquired information processing section 221, the image information processing section 222, the cache memory 223, the identification information extraction section 224, the presence determination section 225, the communication information processing section 226, the priority level setting section 227, the information-for-display generation section 231, the image superimposition section 232, the position coordinates acquisition section 240, the azimuth-angle acquisition section 250, and the like are each typically realized as an LSI which is an integrated circuit. These functional blocks may be formed into one chip, or a part or the whole of the functional blocks may be included in one chip. Although the LSI is mentioned herein, it may also be called an IC, a system LSI, a super LSI, and an ultra LSI, depending on the difference in the degree of integration. Furthermore, the method for circuit integration is not limited to the LSI, and may be realized by a dedicated circuit or a general-purpose processor. An FPGA (Field Programmable Gate Array), which is capable of programming after manufacturing the LSI, or a reconfigurable processor, which is capable of reconstituting connections and configurations of a circuit cell within the LSI, may be used. Furthermore, if a circuit integration technology replacing the LSI technology is developed with an advance of semiconductor technology and other technologies derived therefrom, it is needless to say that integration of the functional blocks may be performed by using the technology. Application of biotechnology or the like may be possible.

<Summary>

According to the information display system of the present embodiment, by giving the cache priority level based on the relationship between change in imaging range, shooting coordinates, and shooting orientation, a high cache priority level can be given to information regarding a source, among the once-captured sources, which is close to the shooting angle of view and is at a position outside the imaging range but at which the source is close to entering the imaging range. Therefore, by improving the responsiveness for the information to be superimposed onto the display image or improving the cache usage rate, time which takes to display information when the information source re-enters the imaging range can be reduced, and even further, cost reduction can be attained.

Second Embodiment

<Outline>

A second embodiment is a combination of the determination for giving the cache priority level in the first embodiment with projection of the movement characteristics of the source in the imaging range. According to the second embodiment, the cache priority level can be given to the source, using coordinates of the source which are corrected in accordance with the projection of the movement characteristics of the source in the imaging range.

<Configuration>

Figure 13:
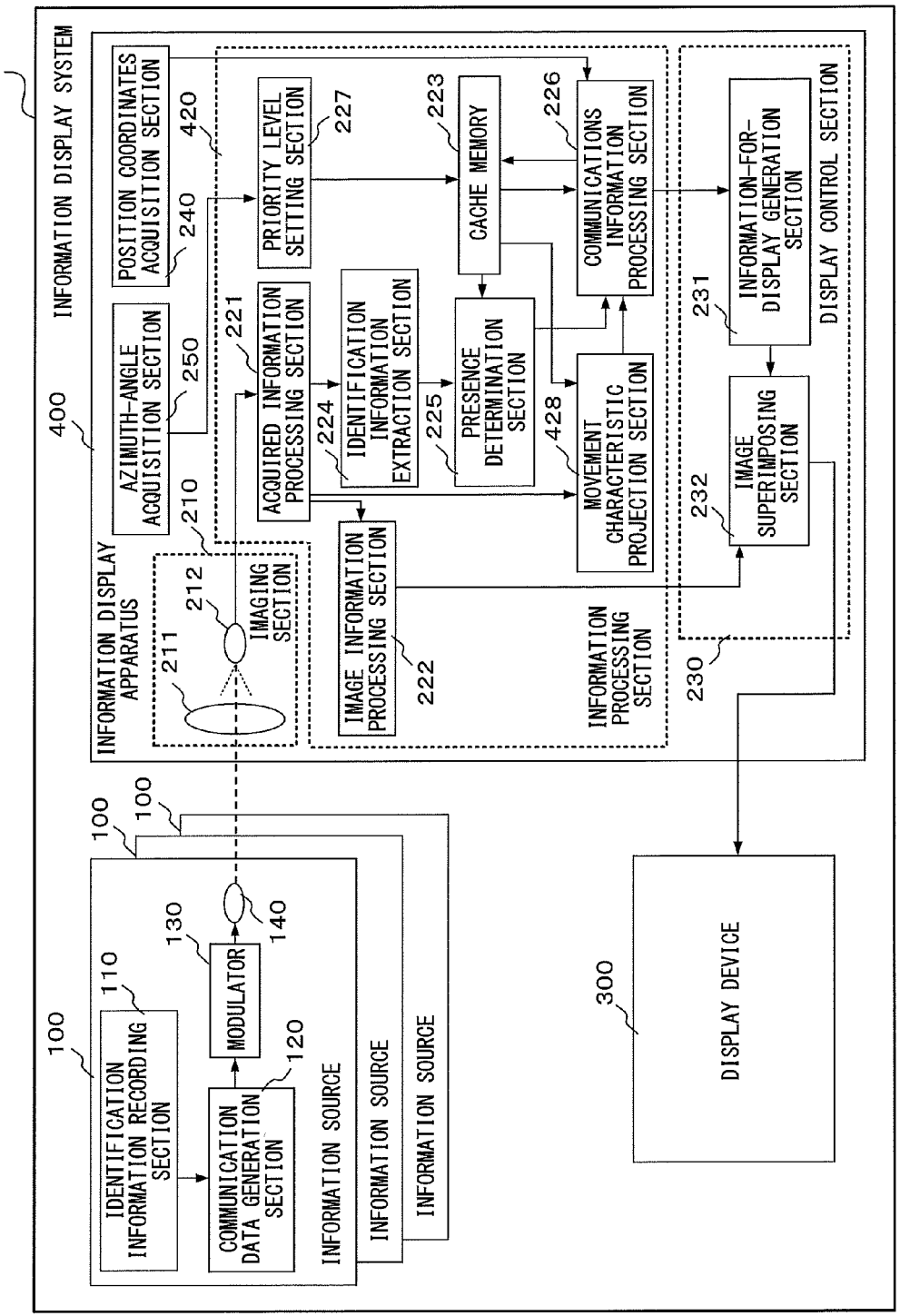
FIG. 13 is a diagram showing an outline of a functional configuration of an information display system 2 in a second embodiment.

FIG. 13 is a diagram showing an outline of a functional configuration of an information display system 2 in the second embodiment.

The information display system 2 shown in FIG. 13 includes the information source 100, an information display apparatus 400, and the display device 300.

It should be noted that the same reference characters are given to the same components as those of the information display system 1 of FIG. 1, and the description thereof is omitted.

The information display apparatus 400 has the configuration of the information display apparatus 200 in the first embodiment with addition of a movement characteristic projection section 428. Since the movement characteristic projection section 428 is added, the information processing section 220 is replaced by an information processing section 420.

The movement characteristic projection section 428 projects the movement characteristics of the source that is in the imaging range, and projects the movement characteristics based on change in coordinates and area of the source if a source region and individual identification information, which are inputted from the acquired information processing section 221, match individual identification information already saved in the cache memory 223. The details will be described in below sections Operation and Use Case.

<Operation>

The sequence starting from the source region detection process through the signal reconstruction process to the superimposition process whereby the information for display is superimposed onto a captured image is the same as described in the first embodiment with reference to FIG. 3.

Figure 14:
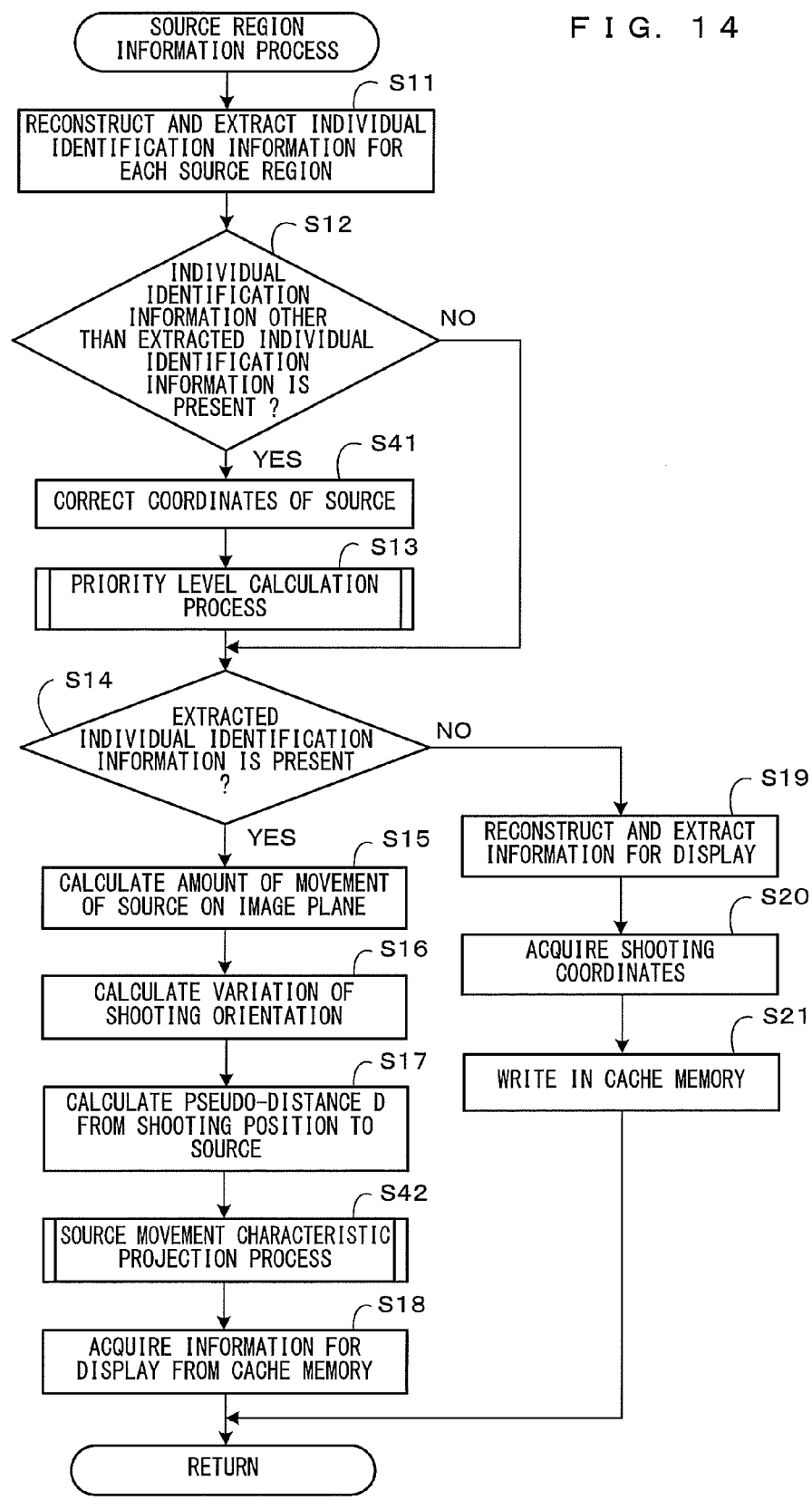
FIG. 14 is a diagram showing a sequence of a subroutine performing the source region information process of step S7 in FIG. 3.

FIG. 14 is a diagram showing a sequence of a subroutine performing the source region information process of step S7 in FIG. 3.

Here, the same reference characters are given to the same steps as in FIG. 4 in the first embodiment, and the description thereof is omitted.

(1) and (2) The same as (1) and (2) in the description of FIG. 4 (steps S11 and S12).

(3) Each of the movement characteristics calculated by a source movement characteristic projection process is multiplied by a difference between the capture time for the source inputted from the presence determination section 225 and the capture time for the source acquired from the cache memory 223 to project the current location of the source, and, on the basis of the projected value, the coordinates of the source having corresponding individual identification information saved in the cache memory 223 are corrected (step S41). Furthermore, using the corrected coordinates of the source, the priority level calculation process of step S13 is performed.

(4) to (8) The same as (3) to (7) in the description of FIG. 4 (steps S13 to S17).

(9) The source movement characteristic projection process is performed to acquire, from the cache memory 223, data for display regarding the source having corresponding individual identification information, and the source region and the information for display are outputted to the information-for-display generation section 231 (step S42).

Figure 15:
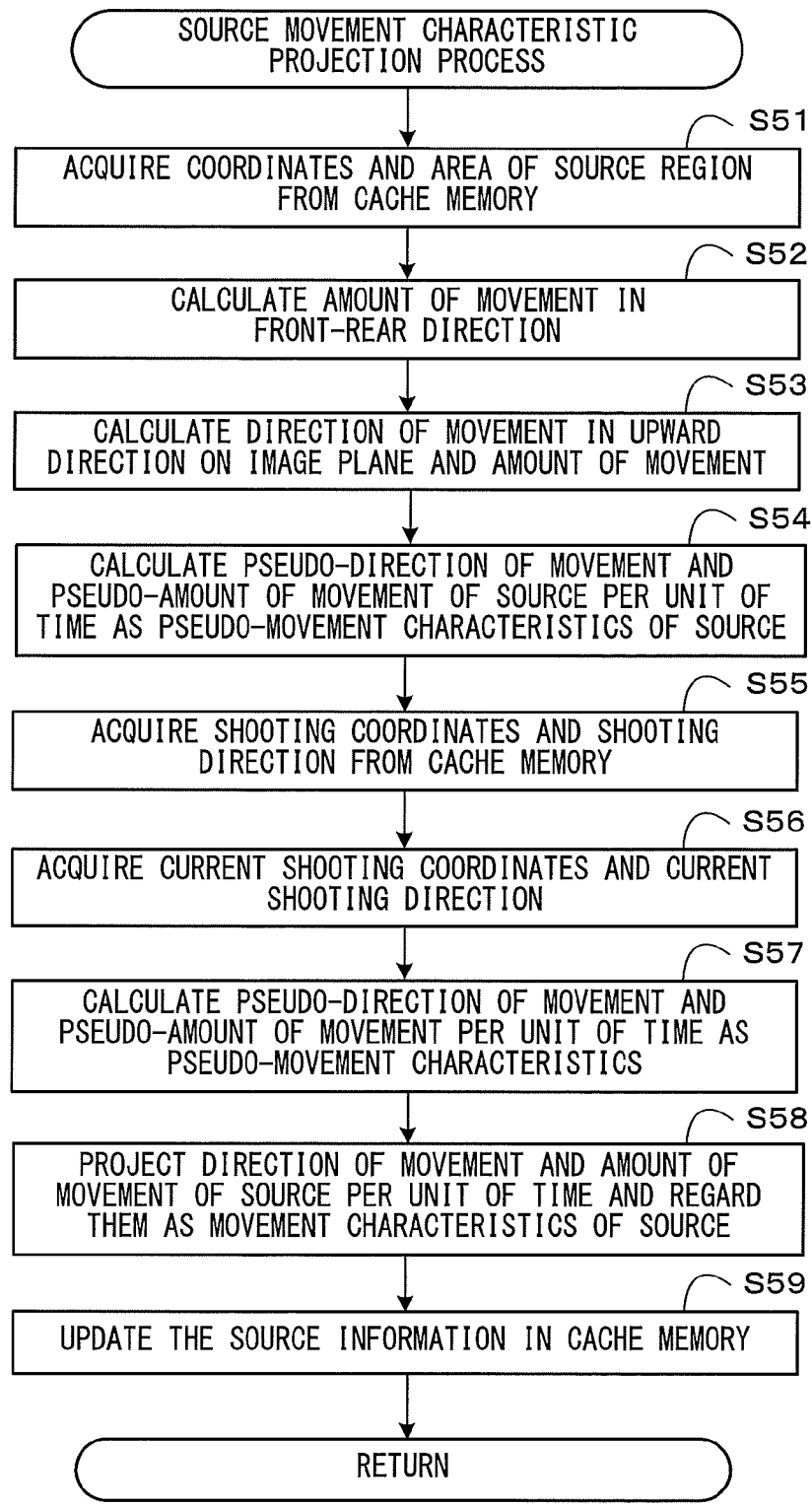
FIG. 15 is a diagram showing a sequence of a subroutine performing a source movement characteristic projection process of step S42 in FIG. 14.

FIG. 15 is a diagram showing a sequence of a subroutine performing the source movement characteristic projection process of step S42 in FIG. 14.

(1) The movement characteristic projection section 428 acquires, from the cache memory 223, coordinates and area of the source region having the individual identification information inputted from the acquired information processing section 221 (step S51).

(2) The amount of movement of the source in the front-rear direction is calculated by determining the direction of movement of the source in the front-rear direction by calculation of a ratio of increase/decrease between the area of the source region inputted from the acquired information processing section 221 and the area of the source region acquired from the cache memory 223, and comparing the calculated ratio of increase/decrease of the area of the source region with a reference value of the amount of movement of the source and reference value of the ratio of increase/decrease of the area of the source which are previously held in the movement characteristic projection section 428 (step S52).

(3) The direction of movement of the source in the upward direction on the image plane and the amount of movement of the source are calculated based on a difference between the coordinates of the source region inputted from the acquired information processing section 221 and the coordinates of the source region acquired from the cache memory 223 (step S53).

(4) The movement characteristic projection section 428 calculates a pseudo-direction of movement of the source and a pseudo-amount of movement of the source per unit of time as pseudo-movement characteristics of the source by dividing each of: the calculated direction of movement in the front-rear direction; the calculated direction of movement in the upward direction on the image plane; and the amount of movement, by a difference between the capture time for the source region inputted from the acquired information processing section 221 and the capture time for the source region acquired from the cache memory 223 (step S54).

(5) The movement characteristic projection section 428 acquires, from the cache memory 223, the shooting coordinates and the shooting direction when an image of the source, having the individual identification information, inputted from the acquired information processing section 221 is captured (step S55).

(6) The current shooting coordinates and the current shooting direction are acquired from the position coordinates acquisition section 240 and the azimuth-angle acquisition section 250, respectively (step S56).

(7) A rotation direction of the information display apparatus 400 and an amount of rotation of the information display apparatus 400 are calculated based on a difference between the shooting direction acquired from the cache memory 223 and the current shooting direction, and the direction of movement of the information display apparatus 400 and the amount of movement of the information display apparatus 400 are calculated based on a difference between the shooting coordinates acquired from the cache memory 223 and the current shooting coordinates. Subsequently, a pseudo-direction of movement and pseudo-amount of movement of the information display apparatus 400 per unit of time as pseudo-movement characteristics of the information display apparatus 400 are calculated by adding the calculated rotation direction to the calculated direction of movement, adding the calculated amount of rotation to the calculated amount of movement, and further dividing each of the resultant direction of movement and the resultant amount of movement by a difference between the capture time for the source region inputted from the acquired information processing section 221 and the capture time for the source region acquired from the cache memory 223 (step S57).

(8) The movement characteristic projection section 428 corrects the coordinates of the source by adding the pseudo-movement characteristics of the information display apparatus 400 calculated in step S57 to the pseudo-movement characteristics of the source calculated in step S54, respectively, to project the direction of movement and amount of movement of the source per unit of time and regards the projected direction of movement and amount of movement of the source per unit of time as the movement characteristics of the source (step S58).

(9) The movement characteristic projection section 428 uses the projected movement characteristics of the source to update the source information in the cache memory 223 (step S59).

It should be noted that the projection method for the movement characteristics in the present embodiment is merely by way of example. The movement characteristics may be projected using, for example, the triangulation method and the continuous movement information, or the movement characteristics may be acquired from outside (information transmitted from the source).

<Summary>

According to the information display system of the second embodiment, the cache priority level can be given to the source, using the coordinates of the source which are corrected in accordance with the projection of the movement characteristics of the source in the imaging range. As a result, the cache priority level upgrades in the case where the shooting coordinates and the shooting direction follow a projected movement position of a moving source after the moving source falls out the imaging range. Therefore, when the source to be moved re-enters the display image, the responsiveness for the information to be superimposed onto a display image can be improved and the cache usage rate can be improved, and even further, cost reduction can be attained.

It should be noted that, in the first embodiment and the second embodiment, the communication information processing section 226 can process the information regarding sources outside the imaging range, in addition to the source in the imaging range. For example, on the basis of the cache priority level given by the priority level setting section 227, the communication information processing section 226 can evaluate the positional relationship between the information display apparatus and the source to the information-for-display generation section 231 in such a manner that the source having higher cache priority level is closer to the imaging region, perform processing according to the evaluation, and output the result of processing.

At this time, the information-for-display generation section 231 outputs the information for display and the information regarding the source region to the image superimposition section 232 such as by generating the information for display in a list format, based on the information inputted from the communications information processing section 221.

Also, on the basis of the information regarding the source region inputted from the information-for-display generation section 231, the image superimposition section 232 determines that the simultaneously inputted information for display is the information for display regarding the source outside the imaging range. Then, the image superimposition section 232 performs tasks such as synthesizing the information for display regarding the sources, which is outside the imaging range and is inputted from the information-for-display generation section 231, onto the list outside the frame of the image-processed image information inputted from the image information processing section 222 to output the resultant image to a display section 18.

The display device 300 adjusts, for display, the brightness or size of the synthesized image inputted from the image superimposition section 232 so that the image-processed image information, and the information for display regarding the sources, which are outside the imaging range, disposed on the list outside the frame are both displayed. In this manner, the communication information processing section 226, the information-for-display generation section 231, the image superimposition section 232, and the display device 300 can display the information regarding the sources outside the imaging range as well, based on the cache priority level given by the priority level setting section 227.

FIG. 16 is a diagram showing an example of a screen, displayed by the display device 300, in which the information for display regarding the sources outside the imaging range that are extracted by the communication information processing section 226 is synthesized onto outside of the frame of the image captured by the imaging section 210.

On the screen shown in FIG. 16, an image 41 obtained by the image-processed image information is displayed, and information 42 for display regarding the sources outside the imaging range is displayed on the list outside the frame of the image 41.

Also, in the first embodiment 1 and the second embodiment 2, description that the preamble data portion D10 and the data portion D20 are cyclically transmitted is given by way of example of the data format of the information transmitted from the information source 100.

Here, a case is assumed where the information required for the display control for one source is segmented into a plurality of (e.g., three pieces of) segmentation information, and the pieces are each packetized together with the same preamble data portion D10 and transmitted to the data portion D20 shown in FIG. 2 at different points in time. In such a case, each piece of segmentation information is, in practical, stored in the information-for-display storage portion D22 shown in FIG. 2, and the same individual identification information is stored in the individual identification information storage portion D21 of each piece of segmentation information. In addition, each packet includes segmentation position data indicative of a corresponding position in the original information.

In such a case, the cache memory 223 further holds a set of the display information, the identification information, and segmentation position information. The identification information extraction section 224 further extracts the segmentation position data. The presence determination section 225 further determines whether each of segmentation position data extracted by the identification information extraction section 224 is in the cache memory 223.

Using the segmentation position data extracted by the identification information extraction section 224, the communication information processing section 226 receives only a packet storing therein missing segmentation information, based on the change of brightness, to extract the missing segmentation information therefrom, and reconstruct the original information before the segmentation.

For example, if the information for display acquired from the cache memory 223 is only one of three pieces of segmentation information, the communication information processing section 226 may receive only two packets storing therein missing segmentation information to acquire the missing two segmentation information by using the segmentation position data, to reconstruct the original information from the three pieces of segmentation information.

In this manner, the communication information processing section 226 can be notified, from the segmentation position data, that the information that can be acquired from the cache memory 223 is the segmentation information corresponding to a portion of the entire information that can be acquired from one source, and the communication information processing section 226 can also acquire only the segmentation information that is not held in the cache memory 223 from the source to unite the segmentation information held in the cache memory 223 and the segmentation information newly acquired from the source.

The information display apparatus, the display control integrated circuit, and the display control method of the present invention are applicable to digital cameras, mobile phones, note PCs, and the like which have functionality to display captured images, and can improve the responsiveness for the information to be superimposed onto the display image and improve the cache usage rate, and thus their values in terms of industrial usefulness are extremely high.

DESCRIPTION OF THE REFERENCE CHARACTERS 100 image source
110 identification information recording section
120 communication data generation section
130 modulator
140 transmitter light source
200 information display apparatus
210 imaging section
211 lens
212 image sensor
220 information processing section
221 acquired information processing section
222 image information processing section
223 cache memory
224 identification information extraction section
225 presence determination section
226 communications information processing section
227 priority level setting section
230 display control section
231 information-for-display generation section
232 image superimposing section
240 position coordinates acquisition section
250 azimuth-angle acquisition section
300 display device
400 information display apparatus
428 movement characteristic projection section

The invention claimed is:
1. An information display apparatus for performing a visual light communication and superimposing light source information transmitted from a light source onto images captured in time sequence for display on a screen, the information display apparatus comprising:
an imaging section that captures an image in time sequence in an imaging range;
a cache memory;
an information processing section that extracts light source information transmitted from a light source in the imaging range; and
a display control section that superimposes the light source information onto the image captured by the imaging section, and displays the image, on which the light source information has been superimposed, on the screen, wherein
the information processing section includes logic that, when executed, performs the steps of
extracting the light source information transmitted from the light source in the imaging range,
sequentially caching, in the cache memory, the extracted light source information,
setting, among the light source information cached in the cache memory, a higher priority level for light source information of a light source that is outside of a cur- rent imaging region on a current image plane but whose position is closer to the current imaging region, and deleting the light source information, cached in the cache memory, in an order starting from light source information having a lowest priority level.

2. The information display apparatus according to claim 1, wherein the information processing section further including logic that, when executed, performs the steps of determining, for a light source outside the current imaging region, whether the light source is close to the current imaging range, based on whether a value of a distance from a center of the current imaging range to a center of the light source is small or whether a value obtained by quantizing the distance is small.

3. The information display apparatus according to claim 2, wherein the information processing section further includes logic that, when executed, performs the steps of projecting movement characteristics, based on change in area and coordinates of the light source in the image, correcting central coordinates of the light source, based on the projected movement characteristics, and determining, for the light source outside the current imaging region, whether the light source is close to the current imaging range, based on whether a distance from the center of the current imaging range to the corrected central coordinates of the light source is small.

4. The information display apparatus according to claim 1, wherein the information display apparatus also displays, on the screen, light source information of a light source which has a high priority level and is outside the current imaging range among the light sources information cached in the cache memory.

5. An information display method for performing a visual light communication and superimposing light source information transmitted from a light source onto images captured in time sequence for display on a screen, the information display method comprising the steps of:

capturing an image in time sequence in an imaging range;

extracting light source information transmitted from a light source in the imaging range;

sequentially caching, in a cache memory, the extracted light source information;

superimposing the light source information onto the captured image and displaying the image, on which the light source information has been superimposed, on the screen;

setting, among the light source information cached in the cache memory, a higher priority level for the light source information of a light source that is outside of a current imaging region on a current image plane but whose position is closer to the current imaging region; and deleting the light source information, cached in the cache memory, in order starting from light source information having a lowest priority level.

6. An integrated circuit for use in an information display apparatus for performing a visual light communication and superimposing light source information transmitted from a light source onto images captured in time sequence for display on a screen, the integrated circuit comprising:

a cache memory;
an information processing section; and
a display control section, wherein the information processing section including logic that, when executed, performs the steps of extracting the light source information transmitted from the light source in the imaging range, sequentially caching, in the cache memory, the extracted light source information, and setting, among the light source information cached in the cache memory, a higher priority level for light source information of a light source that is outside of a current imaging region on a current image plane but whose position is closer to the current imaging region, the display control section superimposes the light source information onto the captured image and displays the image, on which the light source information has been superimposed, on the screen, and the information processing section further performs a step of deleting the light source information, cached in the cache memory, in an order starting from light source information having a lowest priority level.

7. The information display apparatus according to claim 1, wherein the information processing section further including logic that, when executed, performs the steps of extracting identification information transmitted from the light source from which the light source information is extracted, caching the identification information in the cache memory in association with the light source information;

determining existence or absence of identification information other than the identification information transmitted from a light source in a current imaging range in the cache memory, and when the existence of the identification information other than the identification information is determined, setting, among the light source information cached in the cache memory, the priority level to the light source information associated with the identification information whose existence has been determined.

8. The information display apparatus according to claim 1, wherein the information processing section further including logic that, when executed, performs the steps of acquiring and caching, in the cache memory, coordinates of the light source extracted by the light source information, and a pseudo-distance D from the information display apparatus to the light source, calculating a varied angle of a shooting orientation of the imaging section, from a time point of the acquiring of the coordinates of the light source, to a present time, estimating the coordinates of the light source on the current image plane with usage of the pseudo-distance D cached in the cache memory, the coordinates of the light source cached in the cache memory, and the varied angle calculated, and setting the priority level of the light source outside the current imaging region with usage of the coordinates estimated.

9. The information display apparatus according to claim 1, wherein the information processing section further including logic that, when executed, performs the steps of setting the priority level for the light source information of the light source outside the current imaging region on the current image plane, among the light source information cached in the cache memory, in accordance with a priority level region where a position of the light source is located, among a plurality of priority level regions virtually set outside of the current imaging region of the current image plane.

* * * * *